United States Patent [19]

McLelland et al.

[11] Patent Number: 5,496,018
[45] Date of Patent: Mar. 5, 1996

[54] FLUID DAMPED BUSHING WITH ENCAPSULATED WINDOW METAL

[75] Inventors: Douglas M. McLelland; Paul T. Wolfe, both of Ft. Wayne, Ind.

[73] Assignee: GenCorp Inc., Fairlawn, Ohio

[21] Appl. No.: 289,027

[22] Filed: Aug. 10, 1994

[51] Int. Cl.⁶ ........................................ F16M 1/00
[52] U.S. Cl. ......................... 267/140.12; 267/141.4
[58] Field of Search ........................... 267/140.12, 141.2, 267/141.4, 141.5, 140.11, 292, 293, 219, 141; 248/562, 636; 180/300, 312

[56] References Cited

U.S. PATENT DOCUMENTS

| | | | |
|---|---|---|---|
| 4,440,254 | 4/1984 | Shibahata et al. | 180/140 |
| 4,588,174 | 5/1986 | Konishi | 267/140.12 |
| 4,712,775 | 12/1987 | Buma et al. | 267/220 |
| 4,786,036 | 11/1988 | Kanda | 267/140.12 |
| 4,817,926 | 4/1989 | Schwerdt | 267/140.12 |
| 4,865,299 | 9/1989 | Goto | 267/140.12 |
| 4,872,651 | 10/1989 | Thorn | 267/140.5 |
| 4,899,997 | 2/1990 | Thorn | 267/140.12 |
| 4,951,930 | 8/1990 | Uno et al. | 267/293 |
| 4,953,833 | 9/1990 | Schmidt et al. | 267/140.12 |
| 4,958,811 | 9/1990 | Brenner et al. | 267/140.12 |
| 5,024,425 | 6/1991 | Schwerdt | 267/140.12 |
| 5,042,785 | 8/1991 | LeFol et al. | 267/140.12 |
| 5,060,918 | 10/1991 | Kanda | 267/140.12 |
| 5,088,702 | 2/1992 | Thelamon et al. | 267/140.12 |
| 5,098,072 | 3/1992 | Muramatsu et al. | 267/141.2 X |
| 5,139,241 | 8/1992 | Hamaekers et al. | 267/141.4 X |
| 5,158,269 | 10/1992 | Hein et al. | 267/220 |
| 5,184,803 | 2/1993 | Tanabe et al. | 267/140.12 |
| 5,280,885 | 1/1994 | Noguchi | 267/140.12 |
| 5,299,788 | 4/1994 | Kanda | 267/140.12 |
| 5,356,121 | 10/1994 | Ikeda | 267/140.12 |

FOREIGN PATENT DOCUMENTS

| | | | |
|---|---|---|---|
| 0418718 | 3/1991 | European Pat. Off. | 267/140.12 |
| 2841505 | 4/1983 | Germany . | |
| 2118132 | 5/1987 | Japan | 267/140.12 |
| 5280580 | 10/1993 | Japan | 267/140.12 |

Primary Examiner—Robert J. Oberleitner
Assistant Examiner—Peter M. Poon
Attorney, Agent, or Firm—Robert F. Rywalski; Thomas A. Meehan

[57] ABSTRACT

A fluid damped bushing (10) comprising a metallic sleeve (12) and an annular elastomeric body (14) mold bonded to the exterior of the metallic sleeve. The elastomeric body has a spaced apart pair of fluid containing recesses (18, 20) in its exterior surface with a serpentine shaped inertia track (26) in the outermost surface of the elastomeric body to provide communication between the recesses. A window metal sleeve (16) is encapsulated within the elastomeric body by mold bonding, and the window metal sleeve has a longitudinally spaced apart pair of rings (30, 32) above and below the level of the recesses, respectively, and a diametrically opposed pair of webs (38, 40) extending between the rings. A plurality of outwardly projecting pads (28) is located in one of the webs in the region of the inertia track to prevent deformation of the inertia track under load. The annular elastomeric body is inserted into an outer metallic sleeve (36), while the sleeve and the elastomeric body are immersed in a damping fluid, and the diameter of the outer sleeve is then reduced by a swaging process to tightly seal the sleeve against the annular elastomeric body and to seal the damping fluid in the recesses and the inertia track.

13 Claims, 2 Drawing Sheets

FLUID DAMPED BUSHING WITH ENCAPSULATED WINDOW METAL

FIELD OF THE INVENTION

This invention relates to a fluid damped resilient bushing of a type used in automotive suspension or power train systems to improve the noise, vibration and handling characteristics of an automotive vehicle. More particularly, this invention relates to a bushing of the foregoing character with a window metal element that is embedded in or encapsulated by the resilient member of the bushing.

BACKGROUND OF THE INVENTION

Fluid damped bushings are used in automotive suspension and power train applications to improve the noise, vibration and handling characteristics of the automotive vehicle. Typically, such a fluid damped bushing has an inner metal sleeve to which is bonded an elastomeric, resilient member. The annular member has a spaced apart pair of recesses in its outer surface, and the recesses are interconnected by a flow passage that has a high resistance to flow. The resilient member is then surrounded by an outer metal sleeve which seals the recesses and the flow passage of the resilient member.

A fluid damped bushing of the foregoing type typically requires that an intermediate sleeve, known as a window metal, be inserted between the resilient member and the outer sleeve, the window metal sleeve being provided with openings to be aligned with the recesses in the resilient member. Because of the metallic character of the window metal, the outer metal sleeve must be provided with a lining member of a resilient material to provide for proper sealing between the outer metal sleeve and the window metal sleeve.

Further, for proper functioning of a fluid damped bushing it is necessary to provide a restricted passage between the fluid containing recesses, such passage frequently being referred to as an inertia track. The damping effect of the bushing is determined by the resistance to flow of the inertia track, and this, in turn, depends upon its length and its cross-sectional area. When such an inertia track is formed in the resilient member of the bushing, its damping effect becomes variable, because of the possibility that the track can be distorted by the distortion of the bushing as it undergoes the imposition of loads, and the removal of loads, during its normal service.

BRIEF SUMMARY OF THE INVENTION

According to the present invention there is provided a fluid damped bushing which is simpler in construction than fluid damped bushings of the prior art. The fluid damped bushing of the preferred embodiment of the present invention eliminates the need for a sealing liner on the inside surface of the outer metal sleeve of the bushing, and it does so by embedding or encapsulating the window metal within the annular resilient member of the bushing during the molding of the bushing. Thus, the outer metal sleeve directly engages an elastomeric surface of the annular resilient member of the bushing, rather than the metallic surface of the window metal sleeve of the bushing, and the sealing of the inner surface of the outer metal sleeve is by sealing contact between the metallic inner surface of the sleeve and the resilient surface of the annular elastomeric material.

Further, in the preferred embodiment of the present invention the inertia track in the outer surface of the annular resilient member of the bushing, between the spaced apart fluid containing recesses of the bushing, is free from distortion under the normal loads encountered by the bushing in service and reduces inertia track distortion in the axial and circumferential planes due to hydraulic pressure increases during service since the inertia track is supported by the window metal sleeve, which is provided with suitable inertia track defining projections therein.

Accordingly, it is an object of the present invention to provide an improved fluid damped bushing. More particularly, it is an object of the present invention to provide a bushing of the foregoing character which may be produced to close tolerances in a repetitive manufacturing operation at a reasonable cost. More particularly, it is an object of the present invention to provide a fluid damped bushing of the foregoing character whose outer metal sleeve need not be lined with an elastomeric or other resilient sealing material.

For a further understanding of the present invention and the objects thereof, attention is directed to the drawing and the following brief description thereof, to the detailed description of the preferred embodiment and to the appended claims.

DETAILED DESCRIPTION OF THE PREFERRED EMBODIMENT

Figure 1:
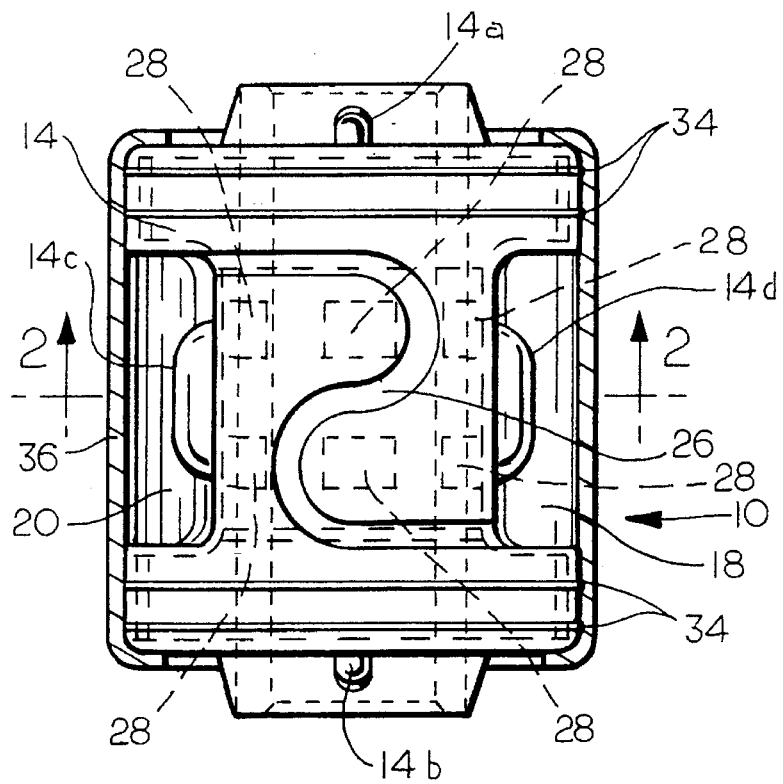
FIG. 1 is an elevational view, partly in cross-section, of a fluid damped bushing according to the preferred embodiment of the present invention.
Figure 2:
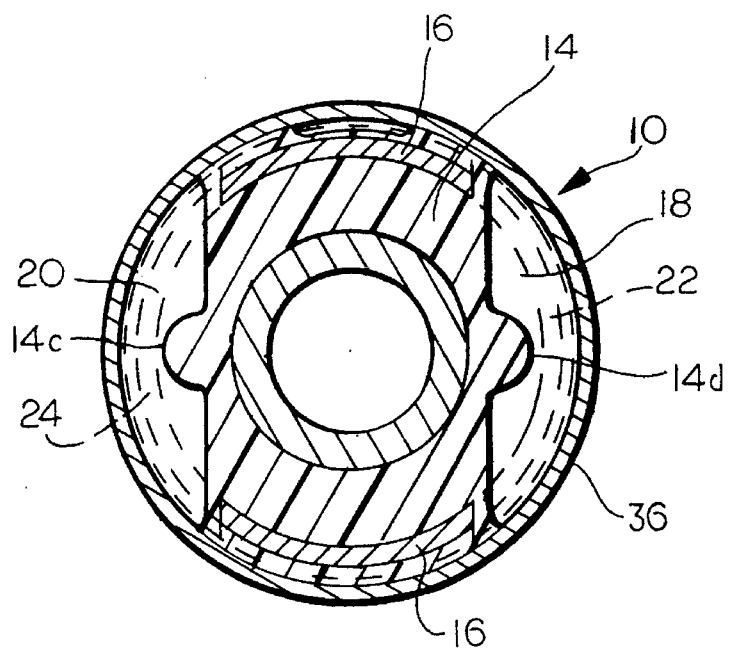
FIG. 2 is a cross-sectional view taken on line 2-2 of FIG. 1.

A bushing according to the preferred embodiment of the present invention is identified generally by reference numeral 10 in FIGS. 1 and 2. The bushing 10 is made up of an inner metal sleeve 12, and the sleeve 12 is mold bonded in surface-to-surface contact to the inner surface of an annular elastomeric body 14. The annular elastomeric body 14 has a window metal sleeve 16 encapsulated therein during its molding process and winds up being mold bonded to the window metal sleeve 16.

The annular elastomeric body 14 is molded with a spaced apart pair of recesses 18, 20 in its outer generally cylindrical surface, each of the recesses 18, 20 beginning below the uppermost extent of the elastomeric body 14 and ending above the lowermost extent of the elastomeric body 14, in the arrangement illustrated in FIG. 1. The window metal sleeve 16 is formed with openings, or windows, 22, 24 in radial alignment with the recesses 18, 20, respectively, of the annular elastomeric body.

Restricted flow communication between the recesses 18, 20 is provided by an inertia track 26 which is formed in the outer, generally cylindrical surface of the annular elastomeric body 14 at a location between the recesses 18, 20. The inertia track 26, which is serpentine shaped to provide for maximum damping, has its opposed ends in fluid communication with the recesses 18, 20, respectively.

The inertia track 26 of the annular elastomeric body 14 is supported against deformation during the distortion of the annular elastomeric body 14, as a result of the loads encountered in normal service, by spaced apart, outwardly projecting pads 28 in the window metal sleeve 16. The outwardly projecting pads 28 are configured to define the inertia track passage. The window metal sleeve 16 is also provided with continuous rings 30, 32 at its upper and lower extremities, respectively, and the annular elastomeric body 14 is provided with one or more outwardly projecting sealing ribs 34 in radial alignment with each of the rings 30, 32, for a purpose which will be hereinafter described more fully. The pads 28 of the window metal sleeve 16 are formed in one of a diametrically opposed pair of webs 38, 40, shown as the web 38, that extend between the rings 30, 32 on opposite sides of the recesses 18, 20. Thus, the webs 38, 40, in combination with the rings 30, 32, serve to form a window metal sleeve 16 of unitary construction.

Figure 4:
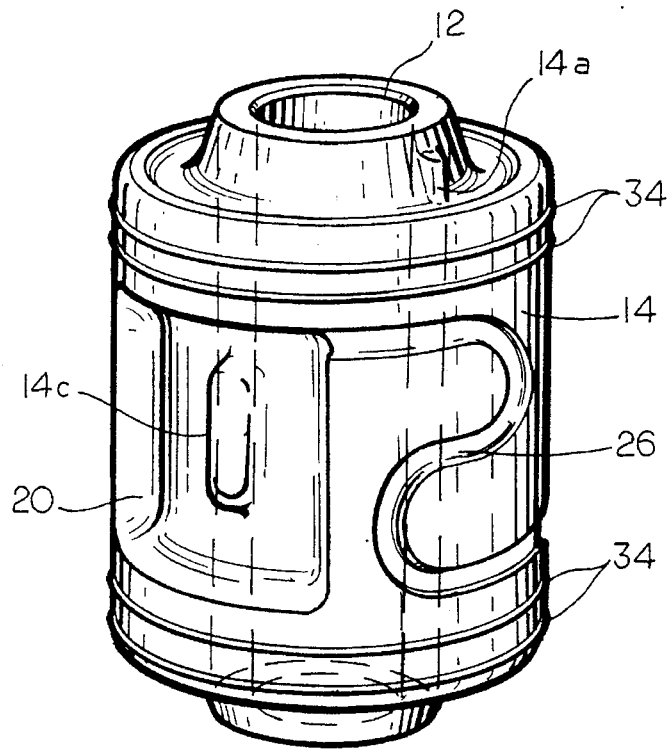
FIG. 4 is a perspective view of a combination of elements of the bushing of FIGS. 1 and 2.
Figure 3:
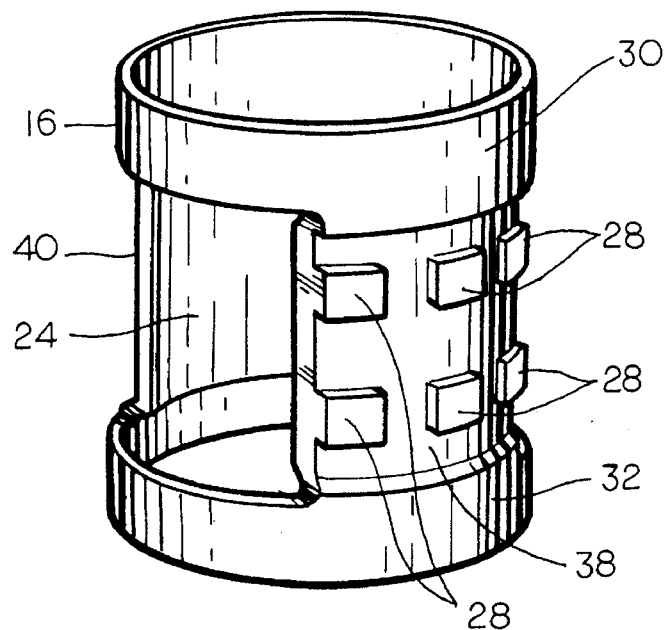
FIG. 3 is a perspective view of an element of the bushing of FIGS. 1 and 2.

A subassembly of the bushing 10, which is made up of the sleeve 12, the elastomeric body 14, and the window metal sleeve 16, as illustrated in FIG. 4, is assembled into its final configuration by immersing the subassembly in a suitable damping fluid to allow the fluid to fill each of the recesses 18, 20, and the inertia track 26. In that regard, a suitable damping fluid can be an aqueous solution of ethylene glycol, or an aqueous solution of propylene glycol, or a mixture of such solutions. While immersed in the damping fluid, the subassembly is pressed into an outer metal sleeve 36, which need not be lined on its inner surface with a pre-applied sealing liner. The sleeve 36 has one of its opposed ends rolled in before the assembly step to serve as a stop for an outermost end of the FIG. 4 subassembly. Then, the sleeve 36 is preferably swaged to slightly reduce its diameter, to thereby ensure a good seal between the inside surface of the sleeve 36 and the ribs 34 of the annular elastomeric body 14. Thereafter, the other of the opposed ends of the sleeve 36 is rolled in against the outermost end of the other end of the FIG. 4 subassembly, to form a fluid tight assembly of all of the components of the bushing 10.

Distortion of the elastomeric body 14 during the loads encountered in service will have the effect of reducing the volume of one of the recesses 18, 20 and increasing the volume of the other of such recesses by an equal amount. This will cause the damping fluid to flow through the inertia track 26 into the recess of the recesses 18, 20 that is increasing in volume. The high restriction to flow of the inertia track 26, which results from its length and its small cross-sectional area, will limit the rate at which the elastomeric body 14 can distort under load, and the rate at which it can return to its unloaded shape when the load is removed. Thus, the fluid in the recesses 18, 20 serves to dampen the distortion of the elastomeric body 14 in its reaction to the loads that it encounters in normal service and as it recovers from the removal of such loads.

Preferably, the annular elastomeric body 14 is molded with outwardly projecting tabs 14a, 14b in its opposed ends. The tabs 14a, 14b are positioned at predetermined positions relative to the recesses 18, 20, and serve to indicate the locations of the recesses 18, 20 in the assembled bushing 10, since the recesses 18, 20 will then be concealed from view by the sleeve 36. Further, the annular elastomeric body 14 is molded with outwardly projecting bumps 14c, 14d centered in recesses 20, 22, respectively. As shown in FIG. 2, the bumps 14c, 14d extend only partly to the inside surface of the sleeve 36. Thus, the bumps 14c, 14d will increase the resistance of the bushing 10 to radial deflection after a predetermined radial deflection of the inner metal sleeve 12 relative to the sleeve 36.

Although the best mode contemplated by the inventor(s) for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. A fluid damped bushing comprising:

a rigid cylindrical member;

an annular elastomeric member having an inner surface, said inner surface of said elastomeric member engaging an outer surface of said rigid cylindrical member in surface to surface contact, said annular elastomeric member further having first and second circumferentially spaced apart recesses in an outer, generally cylindrical surface thereof;

an inertia track passage formed in an outer surface of said annular elastomeric member, said inertia track passage providing restricted fluid communication between said first and second circumferentially spaced apart recesses;

window metal means encapsulated in said annular elastomeric member, said window metal means comprising first and second rings longitudinally spaced apart at locations external to said first and second circumferentially spaced apart recesses and web means extending between said first and second rings to join said first and second rings to one another in a unitary member, said web means comprising radially outwardly projecting pad means serving to support said inertia track passage;

an outermost sleeve circumscribing said elastomeric member, said outermost sleeve sealing a damping fluid contained in said first and second circumferentially spaced apart recesses; and a substantially incompressible damping fluid contained in said circumferentially spaced apart recesses, said damping fluid being added by immersing a subassembly comprising said annular elastomeric member and said window metal means in damping fluid and then pressing the subassembly into said outermost sleeve.

2. A fluid damped bushing according to claim 1 wherein said web means comprises first and second circumferentially spaced apart webs, said first and second webs being circumferentially offset with respect to said first and second recesses.

3. A fluid damped bushing according to claim 2 wherein one of said first and second webs comprises said radially outwardly projecting pad means, said pad means serving to define said inertia track passage to prevent substantial deformation of said inertia track passage under a load applied to the fluid damped bushing.

4. A fluid damped bushing according to claim 2 wherein said pad means comprises a plurality of circumferentially and longitudinally spaced apart pads.

5. A fluid damped bushing according to claim 1 wherein said rigid cylindrical member is a metallic member, and wherein said metallic member is mold bonded to said annular elastomeric member.

6. A fluid damped bushing according to claim 5 wherein said window metal means is encapsulated within said annular elastomeric member by mold bonding.

7. A fluid damped bushing according to claim 1 wherein said damping fluid is selected from the group consisting of an aqueous solution of ethylene glycol, an aqueous solution of propylene glycol and a mixture of an aqueous solution of ethylene glycol and propylene glycol.

8. A fluid damped bushing according to claim 1 wherein said inertia track passage is serpentine shaped in configuration.

9. A fluid damped bushing according to claim 1 wherein said outermost sleeve is a metal sleeve, and wherein each of an opposed pair of ends of said metal sleeve is inwardly rolled.

10. A fluid damped bushing according to claim 1 wherein said outermost sleeve is swaged to reduce its diameter after it is applied to said annular elastomeric member and before one of its opposed ends is inwardly rolled.

11. A fluid damped bushing according to claim 1 wherein said annular elastomeric member is provided with outwardly projecting annular rib means in radial alignment with each of said first and second rings of said window metal means.

12. A fluid damped bushing according to claim 1 wherein the annular elastomeric member is provided with first and second radial bumps, said first and second radial bumps being centered in said first and second circumferentially spaced apart recesses, respectively, and extending only partly to an inside surface of said outermost sleeve, said first and second radial bumps serving to increase the resistance of the bushing to radial deflection of said rigid cylindrical member with respect to said outermost sleeve after a predetermined radial deflection of said rigid cylindrical member with respect to said outermost sleeve.

13. A fluid damped bushing according to claim 1 wherein said outermost sleeve is an unlined metal sleeve, the metal of the unlined metal sleeve directly contacting an outer surface of said annular elastomeric member.

* * * * *